United States Patent
Stout (10) Patent No.: US 10,360,613 B2
(45) Date of Patent: Jul. 23, 2019

(54) SYSTEM AND METHOD FOR MONITORING DISPLAY UNIT COMPLIANCE

(71) Applicant: Asda Stores Limited, Leeds Yorkshire (GB)

(72) Inventor: Philip Stout, Atherton (GB)

(73) Assignee: Walmart Apollo, LLC, Bentonville, AR (US)

( * ) Notice: Subject to any disclaimer, the term of this patent is extended or adjusted under 35 U.S.C. 154(b) by 325 days.

(21) Appl. No.: 15/512,545

(22) PCT Filed: Oct. 1, 2015

(86) PCT No.: PCT/GB2015/052869
§ 371 (c)(1),
(2) Date: Mar. 17, 2017

(87) PCT Pub. No.: WO2016/051182
PCT Pub. Date: Apr. 7, 2016

(65) Prior Publication Data
US 2017/0293960 A1 Oct. 12, 2017

(30) Foreign Application Priority Data
Oct. 1, 2014 (GB) .................................. 1417358.7

(51) Int. Cl.
*G06Q 30/00* (2012.01)
*G06Q 30/06* (2012.01)
(Continued)

(52) U.S. Cl.
CPC ..... *G06Q 30/0623* (2013.01); *G06K 7/10554* (2013.01); *G06K 9/209* (2013.01);
(Continued)

(58) Field of Classification Search
USPC ....................................................... 705/26.1
See application file for complete search history.

(56) References Cited

U.S. PATENT DOCUMENTS

| 8,055,296 B1 | 11/2011 | Persson et al. | |
| 2008/0306787 A1* | 12/2008 | Hamilton | G06Q 10/06 705/7.38 |

(Continued)

FOREIGN PATENT DOCUMENTS

| EP | 2375365 | 10/2011 |
| EP | 2787468 | 8/2014 |

(Continued)

OTHER PUBLICATIONS

Williams, Stephen, "Search Report", British Application No. 1417358.7, dated Mar. 19, 2015, 4 pages.

(Continued)

*Primary Examiner* — Mila Airapetian (57) ABSTRACT

Examples of the disclosure provide a compliance monitoring system suitable for display units in a retail store. A wearable device is configured to be worn by a user while in use. The wearable device may be coupled to a server. The wearable device is configured to capture an image of a product label on a display unit. The wearable device may process the captured image to extract product identity information from a machine-readable portion of the product label. The wearable device may retrieve stored label information from the server based on the extracted product identity information. The wearable device may display the retrieved stored label information in a field of view of the user while the user views a human readable portion of the product label, thereby allowing a compliance comparison therebetween.

15 Claims, 7 Drawing Sheets

(51) Int. Cl.
*G06Q 30/02* (2012.01)
*G06K 7/10* (2006.01)
*G06K 9/20* (2006.01)
*G06K 9/34* (2006.01)
*G06K 9/62* (2006.01)
*G06K 19/06* (2006.01)

(52) U.S. Cl.
CPC ........... *G06K 9/344* (2013.01); *G06K 9/6202* (2013.01); *G06K 19/06028* (2013.01); *G06Q 30/02* (2013.01); *G06Q 30/06* (2013.01); *G06K 2209/03* (2013.01)

(56) References Cited

U.S. PATENT DOCUMENTS

| | | |
|---|---|---|
| 2009/0094140 A1 | 4/2009 | Kwan |
| 2010/0226535 A1 | 9/2010 | Kimchi et al. |
| 2013/0069985 A1 | 3/2013 | Wong |
| 2014/0299660 A1 | 10/2014 | Melzer |

FOREIGN PATENT DOCUMENTS

| | | |
|---|---|---|
| WO | 2006113281 | 10/2006 |
| WO | 2010098275 | 2/2010 |

OTHER PUBLICATIONS

Heselius, Per, "International Search Report", PCT Application No. PCT/GB2015/052872, dated Nov. 19, 2015, 3 pages.

\* cited by examiner

SYSTEM AND METHOD FOR MONITORING DISPLAY UNIT COMPLIANCE

CROSS REFERENCING OF RELATED APPLICATION

The present application claims priority to and is a national phase filing of PCT Application No. PCT/GB2015/052869, entitled "System and Method for Monitoring Display Unit Compliance", filed 1 Oct. 2015 in the receiving office of the United Kingdom. Further, the present application claims priority under Paris Convention to application number 1417358.7 entitled "System and Method for Monitoring Display Unit Compliance" filed 1 Oct. 2014 in United Kingdom.

BACKGROUND OF THE INVENTION

Technical Field

The present application relates in general to systems and methods for monitoring display units such as within a retail store. Particularly, a system and a method are described for monitoring compliance of a display unit.

Description of Related Art

Modern retail stores sell a wide variety of items, including foodstuffs, home and kitchen goods, electronic goods, clothing, sporting goods and so on. Typically, the items are displayed on display units with other similar products. Often the display units are shelving units, though of course other forms of display unit are often employed. The items are removed from the display units by customers, and taken to a point of sale or checkout to be purchased, and the units are replenished by retail store staff on a periodic basis.

The display units show the price of the items held thereon, often by means of physical labels affixed to customer-facing edges of the display unit (e.g. shelf-edge labels). The shelf edge labels may also include relevant promotional information. The retailer may be legally obliged to sell the items at the displayed price. However, in a competitive retail environment, the price of items may change frequently, to take into account factors such as changes in the cost of supply, the demand for the product, the price of the product in competing retail stores, promotional offers and so on.

The retailer's electronic price database is frequently updated to reflect the change in price when the items are processed at the checkout. However, the physical labels are replaced manually by store staff to reflect the change in price. Because of the fast changing nature of the prices and the possibility of human error in the replacement of the physical labels, maintaining consistency between the electronically held price and the physically displayed price—known in the art as "label compliance"—can be problematic.

In one example system, label compliance is enhanced by the installation of electronic displays on the edge of the shelves, known as electronic shelf edge labels or ESELs. These ESELs may be automatically updated in line with the price held in the retailer's price database. However, in a large retail store having several thousand shelves, the cost associated with such a system is relatively high. Also, the ESELs are relatively fragile. Hence, there is a preference to still use printed labels and similar printed display materials.

A further difficulty arises in that items may be removed from the display units by customers or staff and later incorrectly replaced thereon, leading to untidy and visually unappealing shelving units. Also, the display units may not be correctly stocked when the items are replenished by store staff. These erroneously displayed items may inconvenience other shoppers and may result in fewer sales of the items displayed on the untidy units.

Given the importance of display units to the functions of the retail store, considerable planning is given to the design and layout thereof, and the particular items placed thereon. However, the visual state of a display unit—referred to in the art as the "visual compliance"—is typically judged by retail store staff by means of simple visual inspection, and without reference to any material indicating how the shelving unit is intended to look. This can lead to further difficulties, where stock is incorrectly replaced on a unit, and may be displayed alongside price information for a different item. Consequently, the display unit is rendered non-compliant.

It is an aim of the present disclosure to address at least some of the above difficulties, or other difficulties which will be appreciated from the description herein. It is a further aim, at least in some examples, to provide convenient and cost effective systems and methods for ensuring the compliance of a display unit.

SUMMARY OF THE INVENTION

According to the present disclosure there is provided an apparatus and method as set forth in the appended claims. Other features of the disclosure will be apparent from the dependent claims, and the description which follows.

In one example, a compliance monitoring system is described suitable for display units in a retail store. A wearable device is configured to be worn by a user while in use. The wearable device may be coupled to a server. The wearable device is configured to capture an image of a product label on a display unit and may process the captured image to extract product identity information from a machine readable portion of the product label. The wearable device may retrieve stored label information from the server based on the extracted product identity information. The wearable device may display the retrieved stored label information in a field of view of the user while the user views a human readable portion of the product label, thereby allowing a compliance comparison therebetween.

In one example there is described a display unit compliance system, comprising: a wearable device configured to be worn by a user while in use; a server device coupled to the wearable device by a communication network; wherein the wearable device is configured to: capture an image of a product label on a display unit; process the captured image to extract product identity information from a machine readable portion of the product label in the captured image; retrieve stored label information from the server based on the extracted product identity information; and display the retrieved stored label information by the wearable device simultaneously in a field of view of the user with a human readable portion of the product label, thereby allowing a compliance comparison therebetween.

In one example, the wearable device is further configured to: extract displayed label information from a human readable portion of the product label in the captured image; compare extracted label information with the stored label information, and display an alert in the field of view of the user if the retrieved stored label information is not the same as the extracted label information.

In one example, the wearable device is configured to extract the displayed label information using Optical Character Recognition.

In one example, the wearable device is configured to operate in a scanning mode, in which the wearable device continuously captures images.

In one example, the machine readable portion of the product label comprises a barcode.

In one example, the stored label information is stored in a database, and the database is configured to be updated on a periodic basis to reflect changes in the stored label information.

In one example, the wearable device is a pair of smart glasses.

In one example, the system further comprises a second wearable device configured to communicate with the first wearable device, wherein the first wearable device is configured to create a task message and transmit the task message to the second wearable device, and wherein the second wearable device is configured to display the task message.

In one example, in the task message comprises the captured image.

In one example, the second wearable device is configured to transmit a confirmation that the task has been completed to the first wearable device.

In one example, the second wearable device comprises a second image capture unit configured to capture an image showing evidence of the completed task, and wherein the confirmation includes the captured image showing evidence of the completed task.

In one example, the first wearable device is configured to communicate with the second wearable device via the server.

In one example there is described a method of ensuring display unit compliance in a retail store comprising: capturing an image of a product label on a display unit using a wearable device; processing the captured image to extract product identity information from a machine readable portion of the product label in the captured image; retrieving stored label information based on the extracted product identity information; and displaying, by the wearable device, the retrieved stored label information simultaneously in a field of view of the user with a human readable portion of the product label, thereby allowing a compliance comparison therebetween.

In one example the method includes extracting displayed label information from a human readable portion of the product label in the captured image; comparing the extracted label information with the stored label information, and displaying, by the wearable device, an alert in the field of view of the user if the retrieved stored label information is not the same as the extracted label information.

In one example the method includes creating a task; transmitting the task to a second wearable device; and displaying the task on the second wearable device.

In one example there is provided a wearable device which is configured to operate as described herein.

In one example there is provided a server which is configured to operate as described herein.

In one example there is provided a computer readable medium having instructions recorded thereon which when executed cause a computer device to perform any of the methods described herein.

BRIEF DESCRIPTION OF THE DRAWINGS

For a better understanding of the disclosure, and to show how example embodiments may be carried into effect, reference will now be made to the accompanying drawings in which.

In the drawings, corresponding reference characters indicate corresponding components. The skilled person will appreciate that elements in the figures are illustrated for simplicity and clarity and have not necessarily been drawn to scale. For example, the dimensions of some of the elements in the figures may be exaggerated relative to other elements to help to improve understanding of various example embodiments. Also, common but well-understood elements that are useful or necessary in a commercially feasible embodiment are often not depicted in order to facilitate a less obstructed view of these various example embodiments.

DETAILED DESCRIPTION OF EXAMPLE EMBODIMENTS

At least some of the following example embodiments provide an improved system and method suitable for monitoring display units in a retail store. Many other advantages and improvements will be discussed in more detail below, or will be appreciated by the skilled person from carrying out exemplary embodiments based on the teachings herein. The exemplary embodiments have been described particularly in relation to a retail store such as a supermarket or general store for grocery and household items. However, it will be appreciated that the example embodiments may be applied in many other specific environments.

In the following description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Figure 1:
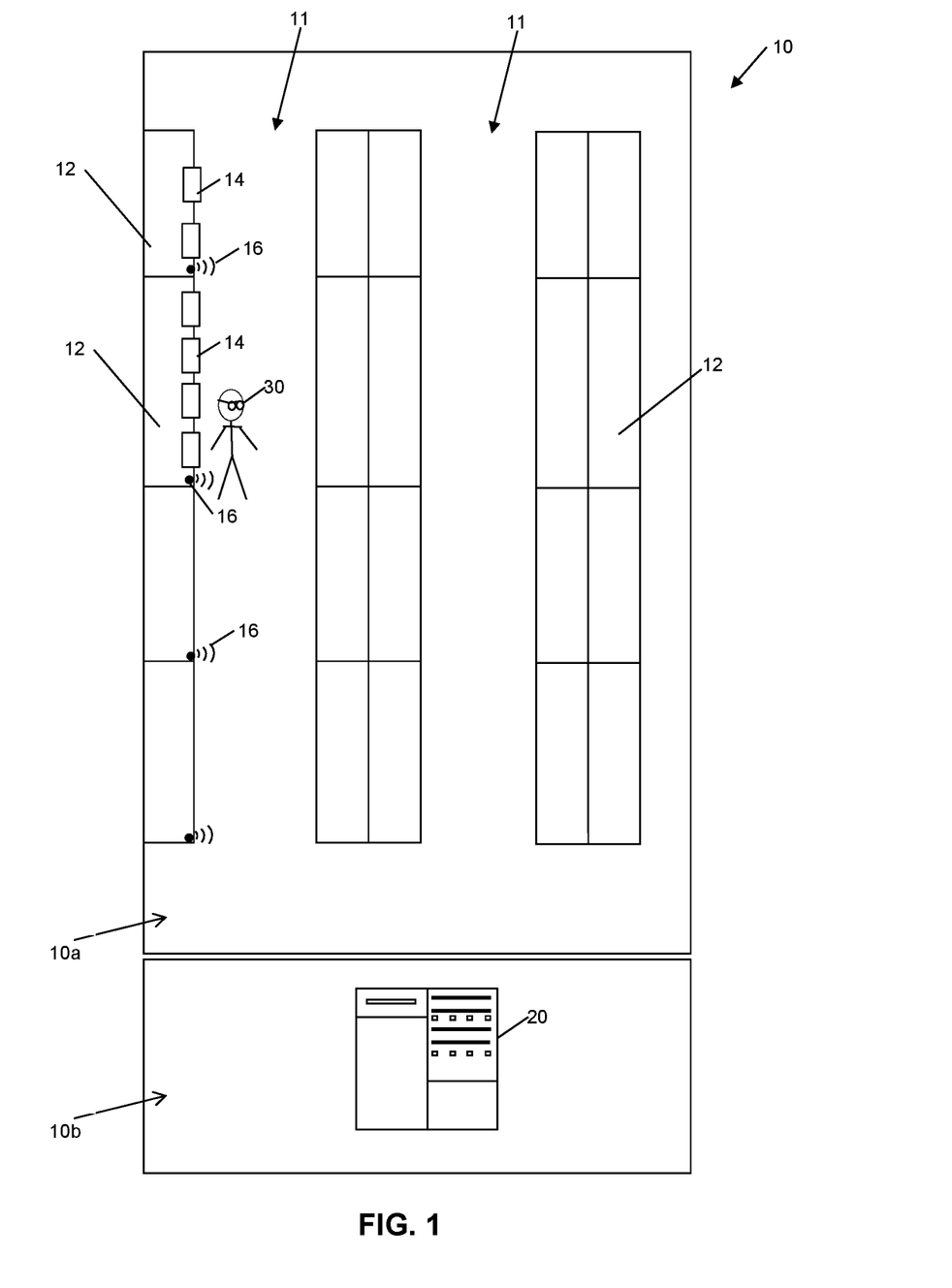
FIG. 1 is a schematic view of an exemplary retail store in which an exemplary display unit compliance system may operate.

FIG. 1 shows a schematic view of a physical environment in which an exemplary embodiment of the system may operate. The physical environment may comprise a retail store 10. The retail store 10 typically comprises a sales area 10a, in which goods are displayed, and an operational area 10b, in which further stock may be held, and infrastructure for the maintenance of the sales area is installed. The operational area 10b may include a server 20, which will be described in further detail below. The retailer's computer network in practice may have many hundreds of stores with various local servers linked to one or more central control computers operated by the retailer, e.g. in their head office. These central control servers may in turn communicate across suitable communication networks with computer systems of suppliers and manufacturers.

The sales area 10a typically includes a plurality of aisles 11, wherein each aisle further comprises a plurality of display units 12. In one example, a display unit 12 may further be comprised of a plurality of shelves (not shown). The display unit 12 may include one or more product labels 14 arranged to be prominently visible to a customer. In one example, the product labels 14 are shelf edge labels as will be familiar to those skilled in the art. The product label 14 may be a printed label. The label 14 may be printed with ink on a substrate such as paper.

Each display unit 12 displays one or more product items. For example, a display unit 12 might display bottles of soft drink A, bottles of soft drink B and cans of soft drink C, amongst other items.

The configuration of the retail store 10 is a matter of some importance, because the layout of the aisles 11 and configuration of the display units 12 has the potential to both positively and negatively impact on sales. Particularly, the layout of the items on the display units 12 is often carefully planned by staff who are trained to maximise the visual appeal of such units 12. However, it will be understood that many configurations of retail store layout and display unit layout are possible, and the embodiments described below are not dependent upon any particular layout or configuration.

FIG. 1 also shows a wearable device 30 which will be described in further detail below. The wearable device 30 is suitable to be worn by a user. In the example embodiments, the user or operator is a member of staff of the retail store.

Figure 2:
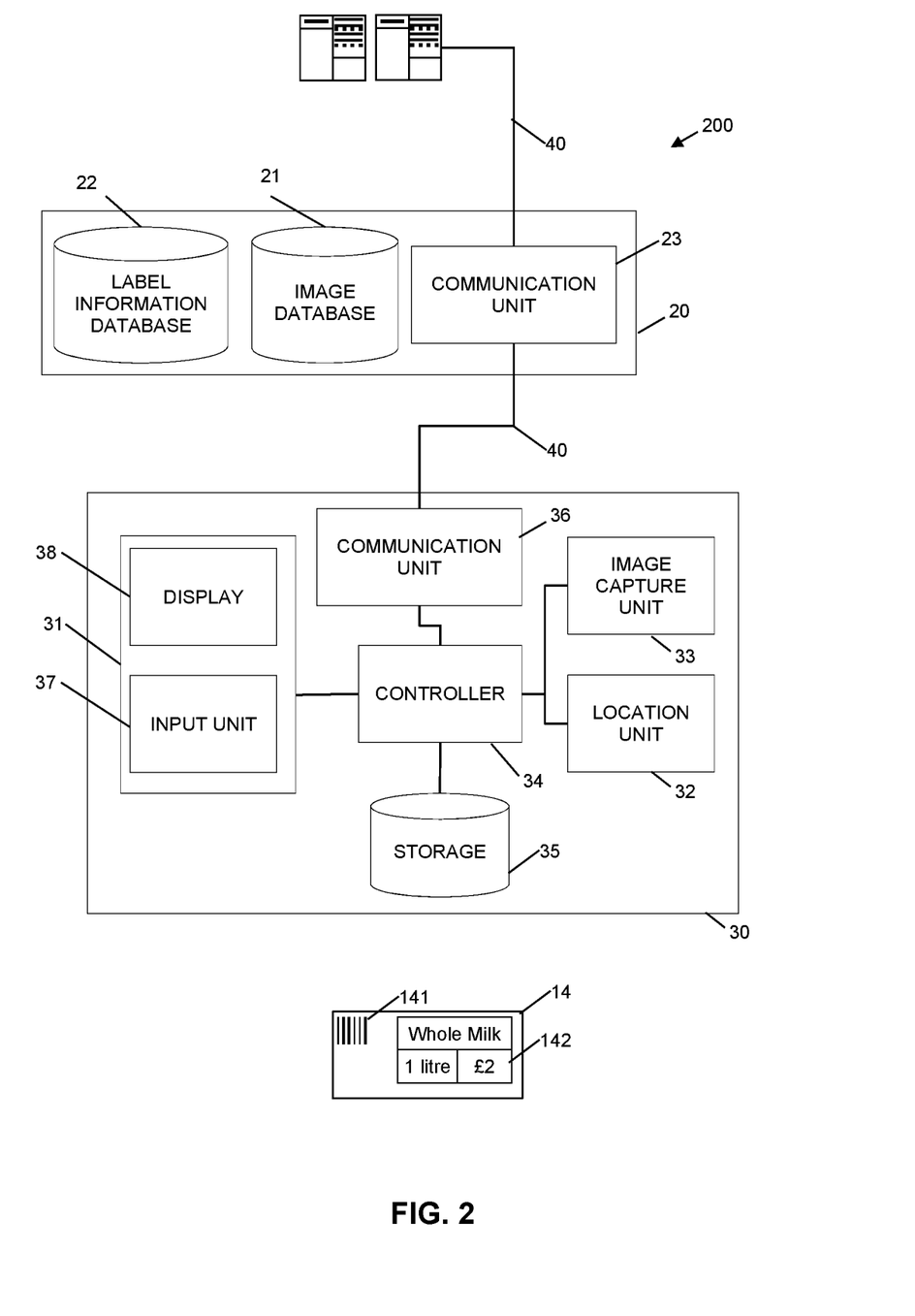
FIG. 2 is a schematic view of an exemplary display unit compliance system.

FIG. 2 shows a schematic diagram of a display unit compliance system 200 in accordance with an exemplary embodiment of the system.

In one example, the system 200 comprises at least one wearable device 30, and at least one server 20 which holds a label information database 22. Conveniently, the label information database 22 stores label information related to the items which are offered for sale in the retail store 10. The label information may comprise information which is displayed on the product labels 14. Particularly, the label information may comprise a description, a quantity, a price, and other data relevant to the items. In one example, the label information may further comprise information regarding any promotional offers (e.g. "buy one get one free", "three for the price of two", "20% extra free"), and information relating to the size of the items (e.g. "6×330 ml", "454 g"). The label information database 22 may be updated on a periodic basis, or updated dynamically to reflect changes in the prices of items in the retail store.

In one example, the server 20 and the wearable device 30 may be linked by a communication network 40. The network may take any suitable form, including secure wired and/or wireless communication links, as will be familiar to those skilled in the art. In one exemplary embodiment, the server 20 may be located within the retail store 10, and may be connected to the wearable device 30 using a wireless local area network (e.g. a WiFi network). In further exemplary embodiments, the server 20 may be located off-site, either in a central or regional data processing site operated by the retailer or some other remote location, and the connection between server 20 and wearable device 30 may include a wide area network, such as over a private leased line or the Internet.

The server 20 may further include a communication unit 23, which is operable to manage communications over the network 40 between the server 20 and the wearable device 30. The server communication unit 23 may also manage communication between the server 20 and other servers. Thus, the server 20 may be part of a corporate server network or back-end network. For example, these other servers may be located in other stores, in other regional data processing sites or in a head office site. In one embodiment, information for updating data held at the server 20, such as the label information database 22, may be received from a controlling server at the head office site, via the server communication unit 23.

Conveniently, the label information database 22 is held on the server 20 to be accessible in use by the wearable device 30. However, it will be understood by those skilled in the art that the label information database 22 could instead be stored locally on the wearable device 30, e.g. by caching part or all of the stored information. Further, some or all of the database may be made available via any other suitable computing device as a distributed database.

Portable devices, such as tablets or smart phones, are well known. Such devices are designed and intended to be carried by a user, and are configured to be operated while in the hands of the user. By contrast, the wearable device 30 is also portable, but is further designed to be worn by a user during operation of the device. Advantageously, a wearable device may be configured to leave the user's hands free to perform other tasks while operating the device. The wearable device 30 may be smart glasses such as Google Glass™. In other examples, the wearable device 30 may be configured as a pendant, a smart watch, or a hat. In yet further examples, the wearable device 30 may be constructed as a patch or as a thin film incorporated in or attached to clothing, or any other piece of clothing or accessory which is adapted to incorporate technological elements.

In one example, the wearable device 30 may comprise a controller 34, a storage 35, a user interface (UI) module 31, a communication unit 36, a location unit 32 and an image capture unit 33. The user interface module 31 may include an input unit 37 and a display 38.

The controller 34 is operable to control the wearable device 30, and may take the form of a processor. The storage 35 is operable to store, either transiently or permanently, any relevant data required for the operation and control of the wearable device 30. The communication unit 36 is operable to manage communications with the server 20 over any suitable network.

The user interface module 31 is operable to input and output information to a user via one or more interfaces. In one exemplary embodiment the UI module 31 comprises an input unit 37 which is operable to receive instructions or commands from the user, and a display 38, which is operable to display at least one image to the user.

The display 38 may be a screen which is integral to the wearable device 30, but it is not limited thereto. In an embodiment where the wearable device 30 is a pair of smart glasses, the display 38 may be a Heads-Up Display (HUD) on the glass or a similar display projected into the field of view of the user.

The input unit 37 may receive user input by means of a button, a touch-screen unit, voice activation, gesture recognition or any other suitable means for receiving user instructions. The input unit 37 may also be operable to receive user input from a combination of these sources The image capture unit 33 comprises a camera and is operable to capture an image.

The wearable device 30 may further comprise a location unit 32. The location unit 32 may be operable to detect the location of the wearable device 30. The location unit 32 may determine a current position of the device 30 within the retail store 10, such as by using an indoor positioning system. The indoor positioning system may employ the Global Positioning System (GPS) to establish the location of the device 30 within the retail store. The location unit 32 may instead or in addition employ proximity sensors using Bluetooth® low energy (e.g. iBeacons), WiFi, Near-Field Communication (NFC) or any other suitable locating means.

In one example, the display units 12 are adapted to contain locator beacons 16 as shown in FIG. 1, such as Bluetooth low energy beacons (e.g. iBeacons). The wearable device 30 may determine location using one or more of the locator beacons 16 (e.g. based on relative signal strength, or based on each beacon covering a certain floor area).

In one example, the locator beacons 16 may also act as a source of relevant information, which may be transmitted locally over the Bluetooth or other wireless connection to the wearable device 30. For example, a locator beacon unit is loaded with information relevant to the display unit 12 associated with that beacon. The locator beacon unit may now act as an intermediary on behalf of the server 20. The locator beacon unit may transmit the stored information relevant to the associated display unit 12 when the wearable device 30 is in the proximity of that locator beacon unit.

In a further exemplary embodiment, the location unit 32 may be configured to scan a visible machine-readable code, such as a barcode attached to a display unit 12, to establish the current position of the wearable device 30.

In one example, the code may be displayed on a shelf edge label. In further exemplary embodiments, the code may be a barcode attached to an item displayed on the display unit 12, and the location unit 32 may establish the current position of the device 30 based on the expected location of that item in a store layout plan.

FIG. 2 shows an exemplary product label 14 in the form of a shelf edge label. The product label 14 comprises at least one machine readable portion 141, such as a barcode. The product label 14 suitably further comprises at least one human readable portion 142 giving metadata in relation to the product, such as the manufacturer, description, quantity, price, and so on.

In use, the wearable device 30 controls the image capture unit 33 to capture an image of the product identification information displayed on the product label 14. The identification information may comprise a barcode or any other suitable machine-readable information, which relates to an item displayed on the display unit 12.

The wearable device 30 may capture the image in response to a user command received via the input unit 37 (e.g. a spoken command such as "OK Glass, Check Label"). The wearable device 30 may also operate in a scanning mode, in which the image capture unit 33 continuously captures images, and any barcode which appears in the image is used.

Next, the wearable device 30 extracts the machine readable identification information from the captured image. Subsequently, based on the extracted identification information, the wearable device 30 queries the label information database 22 to retrieve the correct and up-to-date label information for the item.

Next, the retrieved label information is compared with the label information displayed on the human readable portion 142 of the product label 14. In one embodiment, the wearable device 30 shows the retrieved label information on the display 38. Consequently, the user can quickly compare the retrieved label information with the displayed label information, and identify any discrepancy therebetween. In embodiments where the wearable device 30 is a pair of smart glasses, the retrieved label information may be displayed in a field of view of the user, thereby allowing simultaneous viewing of the retrieved label information and the human readable portion 142 of the product label 14.

In a further embodiment, the wearable device 30 is operable to control the image capture unit 33 to capture an image of the human readable portion 142 of the product label 14, and extract the displayed label information therefrom. In one embodiment, the wearable device 30 may use Optical Character Recognition (OCR) to extract the displayed label information from the captured image of the human readable portion 142. In one example, at least one field or portion of the label information obtained by OCR is used to retrieve the label information from the label database 22, thus allowing a comparison between these two sets of information.

In one example, the wearable device 30 compares the retrieved label information as obtained from the label information database 22 with the extracted displayed label information as obtained from the image of the human readable portion 142 captured by the image capture unit 33. The result of the comparison may be shown on the display 38. Particularly, the display 38 may be configured to show an alert to the user that there is a discrepancy between the displayed label information and retrieved label information.

In an embodiment where the wearable device 30 operates in the scanning mode, the wearable device 30 may automatically alert the user of a detected non-compliance, or potential non-compliance, without specifically needing a user input command. Consequently, the wearable device 30 can automatically identify a discrepancy between the displayed label information and the retrieved label information while in the scanning mode and alert the user to that discrepancy.

Figure 3:
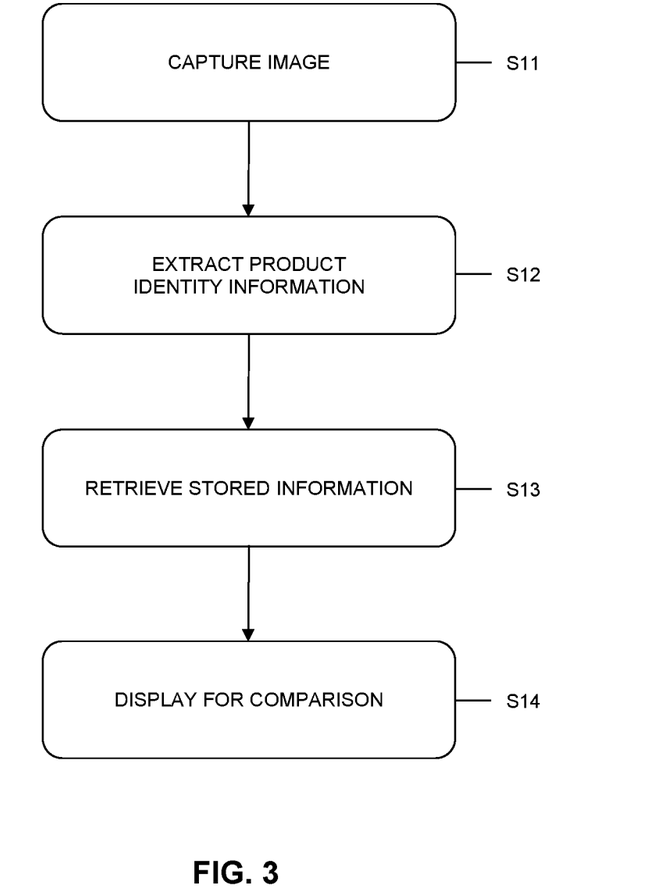
FIG. 3 is a flowchart of an exemplary method of ensuring display unit compliance.

FIG. 3 is a flowchart of an exemplary method.

Step S11 comprises capturing an image of a product label 14 on a display unit 12 using a wearable device 30.

Step S12 comprises processing the captured image to extract product identity information from a machine readable portion 141 of the product label 14 in the captured image.

Step S13 comprises retrieving stored label information based on the extracted product identity information.

Step S14 comprises displaying, by the wearable device 30, the retrieved stored label information simultaneously in a field of view of the user with a human readable portion 142 of the product label 14, thereby allowing a compliance comparison therebetween In a further exemplary embodiment, the system 200 is operable to ensure the visual compliance of a display unit 12. Particularly, the system 200 may assist in monitoring that the display unit 12 comprises the correct items, and that the items are placed in the correct position. Furthermore, the system 200 may ensure that the items are orientated correctly, and the correct quantity of items is placed thereon.

In one example, the system 200 may further comprise an image database 21, containing images of display units 12. In an exemplary embodiment, the image database 21 is located on the server 20, though it will be understood by those skilled in the art that the image database could instead be stored locally on the wearable device 30, or on any other suitable computing device.

In one example, the images in the image database 21 are reference images of ideal or planned display units 12, which are fully stocked and have all the intended items in the correct positions. Such images are also known a planograms or POGs. The planogram images may be photographs of example physical display units 12. Equally, the images may be concept diagrams or other images generated in the process of planning the configuration of the display units 12. Metadata may be associated with each display unit 12 or module, referring to the products to be stocked. The metadata may include a plurality of information fields for each product, such as: product name/description (e.g. Orange Juice); product details (Own Brand); product size (1 L); item number (e.g. retailer's stock keeping number or sku); price (£1); case quantity (number of items per pack or case, e.g. 6-pack) and fill quantity (number of cases or packs for a fully-stocked shelf, e.g. 25).

In use, the wearable device 30 may receive an input command from the user, via the input unit 37, indicating that the user wishes to check the visual compliance of a display unit 12. The input may take the form of a voice command, a button press, a touch-screen command or the like.

The wearable device 30 then determines which display unit 12 is to be checked for compliance. In an exemplary embodiment, the wearable device 30 controls the location unit 32 to establish the most proximate display unit 12, using the indoor positioning system. The location unit 32 may retrieve location data of the current display unit 12 from the server 20, or the location of relevant display units may be stored on the wearable device 30. The user then may input another command to select the display unit 12 to be checked from amongst the one or more proximate display units 12. The selected display unit 12 may have an identification number or the like associated therewith, for ease of selection and further processing.

In exemplary embodiments, the wearable device 30 may also employ measurements from accelerometers or other sensors in the device to establish the display unit 12 at which the user's attention is focused, in order to establish the display unit 12 which is to be checked for compliance.

Subsequently, the wearable device 30 retrieves the reference image of the display unit 12 to be checked, from the image database 21. In an exemplary embodiment, the wearable device 30 may query the image database 21, based on an identification number associated with the selected display unit 12, in order to retrieve the corresponding reference image.

Figure 4:
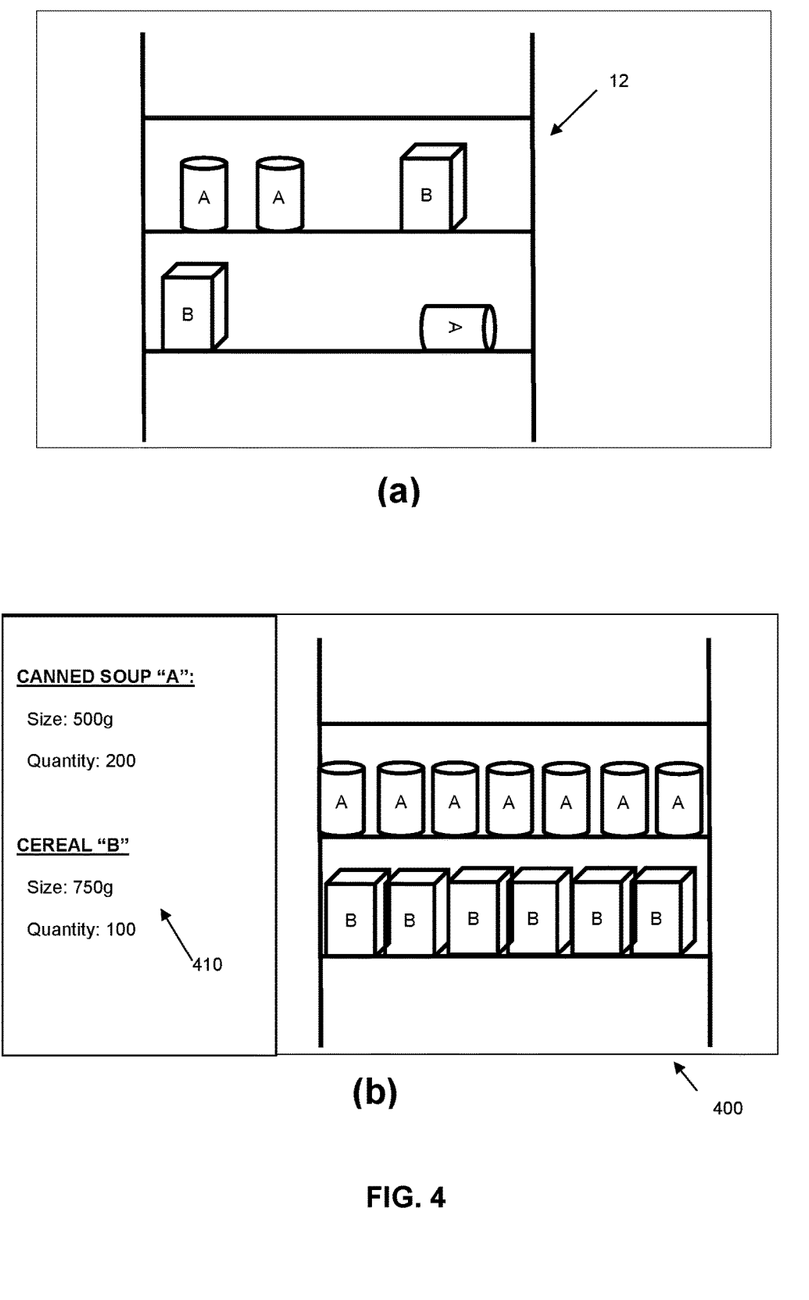
FIG. 4 is an exemplary display of the wearable device of the display unit compliance system.

Subsequently, the retrieved reference image or planogram is displayed on the display 38. FIG. 4b shows an example reference image 400, which shows the intended state of the display unit 12. In addition to the displayed image 400, one or more lines of metadata 410 associated with the reference image 400 may also be displayed on the display 38.

Next, a comparison may be made between the retrieved reference image 400 and the actual state of the display unit 12. FIG. 4a shows an example of the actual state of the display unit 12, with FIG. 4b showing the example reference image 400 of the display unit.

In one example embodiment, the user may simultaneously view on the display 38 both the reference image 400 and the actual display unit 12. The user then may more accurately assess the state of the display unit 12. In embodiments where the wearable device 30 is a pair of smart glasses, the reference image 400 may be shown in a manner which allows the user to make the comparison easily with minimal eye movement. Particularly, the reference image 400 may be shown in the field of view of the user, allowing simultaneous viewing of the display unit 12 and the reference image 400.

The user then may return the display unit 12 to a visually compliant state, with reference to the reference image 400. This may comprise the user tidying the display unit and/or replenishing the stock held thereon.

In a further exemplary embodiment, the wearable device 30 may be configured or adapted to capture an image of the actual state of the display unit 12 using the image capture unit 33. In exemplary embodiments, the retrieved reference image 400 may be displayed on the display 38 whilst capturing the image, so that the captured image and the retrieved image may show similar vantage points, thereby easing comparison.

The wearable device 30 then compares the two images and identifies the differences therebetween. The wearable device 30 may use any suitable algorithm to identify the differences, as would be familiar to one skilled in the art.

The display 38 then shows one or both of the two images, and highlights any differences therebetween. For example, the areas of difference between the two images may be highlighted by the display. In one example, an area of interest may be marked by a coloured circle around each difference, or outlining certain portions of the display region. However, user feedback may take the form of any suitable visual or audible or tactile feedback appropriate to the configuration of the wearable device 30.

The user may then return the display unit 12 to a compliant state, with reference to the highlighted differences between the captured image and the reference image.

In a further exemplary embodiment, the wearable device 30 may be configured to enter a scanning mode while monitoring for compliance. Particularly, the wearable device 30 may monitor compliance as a background task. Monitoring may take place continuously and unobtrusively while the user carries out other duties. The user may be alerted by the device 30 when an event is detected indicating a potential non-compliance. The device 30 may then be configured to enter an investigation mode in which the situation is assessed in more detail, e.g. looking in detail at a particular display unit 12 or product label 14, and more detailed visual or other feedback provided to the user in the manner described herein.

Instead of receiving a user command to initiate the visual compliance check, the wearable device 30 may automatically retrieve the reference image 400 of the display unit 12. Particularly, the wearable device 30 may be configured to control the location unit 32 to automatically retrieve the reference image 400 of the display unit that is currently in the field of view of the user. Alternatively, the wearable device 30 may be configured to control the location unit 32 to automatically retrieve the reference image 400 of the display unit that is currently most proximate to the user.

In a further exemplary embodiment, the wearable device 30 may also be configured to automatically capture the image of the actual state of the display unit 12.

Figure 5:
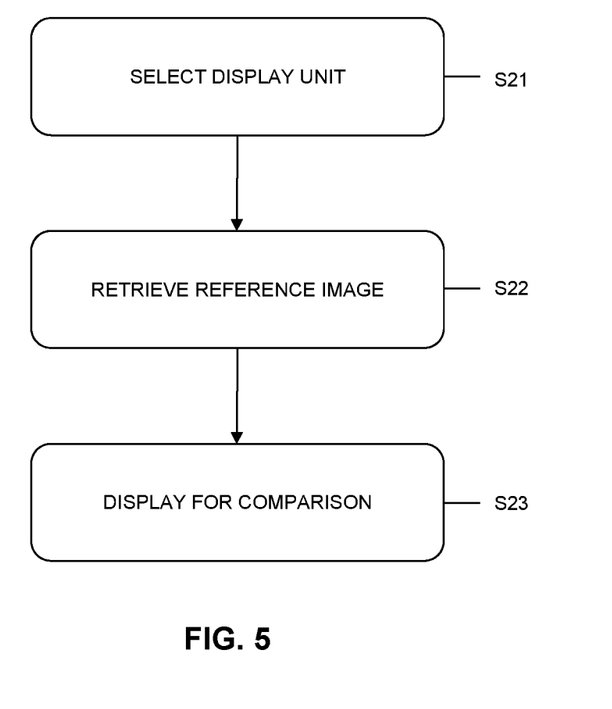
FIG. 5 is a flowchart of a further exemplary method of ensuring display unit compliance.

FIG. 5 is a flowchart of an exemplary method.

Step S21 comprises determining, by a wearable device, a display unit to be checked for compliance.

Step S22 comprises retrieving a reference image, the reference image showing the display unit in an ideal state.

Step S23 comprises displaying, by the wearable device, the retrieved reference image in a field of view of the user with the display unit, thereby allowing a compliance comparison therebetween.

Any of the above embodiments may be advantageously augmented by further including a second wearable device, operable to communicate with the first wearable device.

Figure 6:
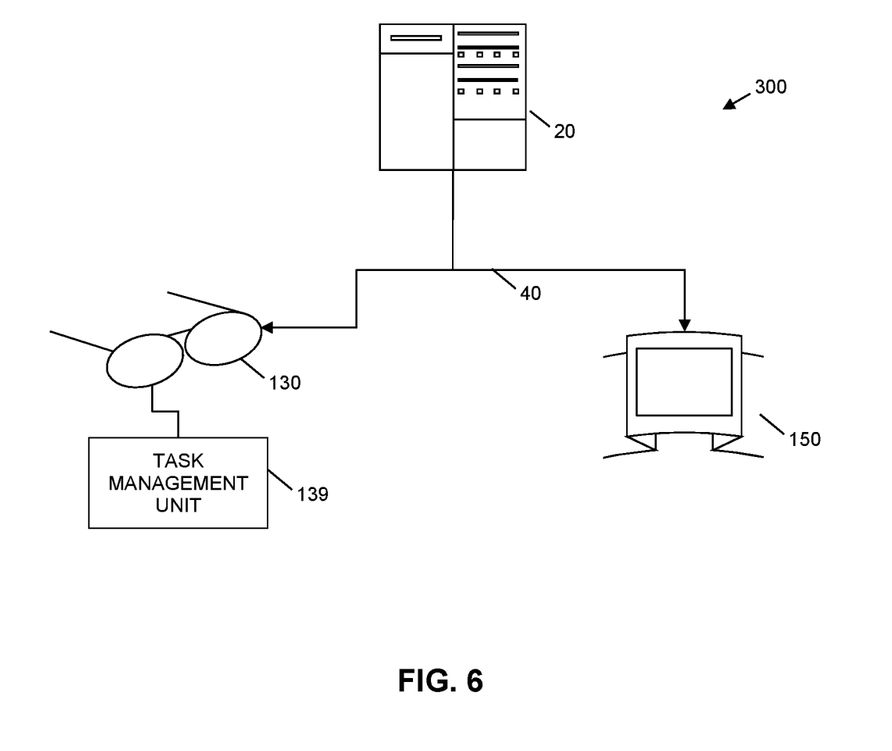
FIG. 6 is a schematic view of a further exemplary display unit compliance system.

FIG. 6 shows a display unit compliance system 300 in accordance with another exemplary embodiment of the system.

The system 300 comprises one or more servers 20 as described above, and therefore the description thereof is not repeated. In this example, the system 300 comprises at least one first portable electronic device 130 which is suitably a wearable device in the manner described above. The system 300 may further comprise at least one second portable electronic device 150, which is conveniently another wearable device.

In one example, the first wearable device 130 may be operated by a first user. In one example, the first user may be a senior member of staff who is tasked with monitoring operations in a retail store.

In one example, the first wearable device 130 further comprises a task management unit 139. The task management unit 139 is operable to create a task and to assign the task to a second user. The system 300 is then configured to transmit the task to another device which is operated by a second user. For example, the task may be "Correct non-compliant labels on display unit 4 of aisle 1" or "Replenish display unit 7 of aisle 3". In this way, the task may be assigned to the second user. In one example, the second user is a member of staff whose regular duties include the upkeep of display units and/or the replenishment of stock.

The task management unit 139 is also operable to receive a confirmation that the task has been completed. In exemplary embodiments, the task management unit 139 may receive an image showing the now-compliant display unit 12 in order to confirm that the task has been completed.

The second wearable device 150 may be transported and operated by the second user. In one example, the device 30 may be configured as a smart watch. The smart watch is wearable around a wrist of the user while being operated. The second wearable device 150 may have a user interface (UI) unit, which shows information to the second user and receives commands and/or instructions from the second user. The user interface (UI) unit suitably comprises a display screen for displaying information to the second user, and a user input unit to receive user input commands.

The second wearable device 150 is operable to communicate with the server 20, in a similar fashion to the first wearable device 130, via an appropriate communication unit. The second wearable device 150 may therefore communicate with the first wearable device 130 via the server 20. The second wearable device 150 may also be configured to communicate directly with the first wearable device 130, without communicating via the local store server 20.

Particularly, the second wearable device 150 is operable to receive a task message originating from the first wearable device 130 and notify the user of the task such as by displaying the task on the display. The user input unit 137 may be operable to receive confirmation from the second user that the task has been completed. For example the second user may press a button or touch a region of a touch screen display to indicate that the task has been completed.

The second wearable device 150 then transmits the confirmation to the first wearable device 130.

In a further exemplary embodiment the second wearable device 150 may further comprise an image capture unit. The image capture unit may include a camera within or communicably linked to the device, which is operable to capture an image of the display unit 12. The second wearable device 150 may transmit the captured image to the first wearable device 130 along with the confirmation message, in order to provide evidence that the task has been completed. These communications may occur directly, or may pass through a central command and logging station, such as provided by the server 20.

In use, the first wearable device 130 is operated as outlined in the embodiments described above. However, rather than the user of the first wearable device 130 being responsible for returning the display unit 12 to a compliant state, the first user controls the first wearable device 130 to set a task directed to the second device 150 for completion by the second user.

The first user may control the first wearable device 130. The command to set the task may take the form of a voice command, a button press, a gesture or similar.

The first wearable device 130 then transmits the task to the second wearable device 150. If the task relates to the shelf edge compliance of the display unit, the transmitted task may include a captured image of the product label 14. If the task relates to the visual compliance of the display unit, the transmitted task may include a reference image of the display unit 12, a captured image of the display unit 12 and/or an image highlighting the differences between reference and captured images.

On receipt of the task message, the task information may be displayed for the attention of the second user. The second user then may carry out the task—i.e. correct the shelf edge label, or replenish the relevant display unit 12—with reference to the task and images displayed. The second user may tidy the display unit 12 with reference to the reference image, thereby minimising errors in tidying or replenishment.

On completion of the task, the second user may control the second wearable device 150 to confirm that the task has been completed. In addition, the second user may control the second wearable device 150 so that the image capture unit captures an image of the now-compliant display unit 12 or product information label 14.

The confirmation message, optionally including the confirmation image, is then transmitted to the first wearable device 150. The task management unit 139 of the first wearable device may then mark the task as completed, and store the image as evidence that the task has been completed.

Figure 7:
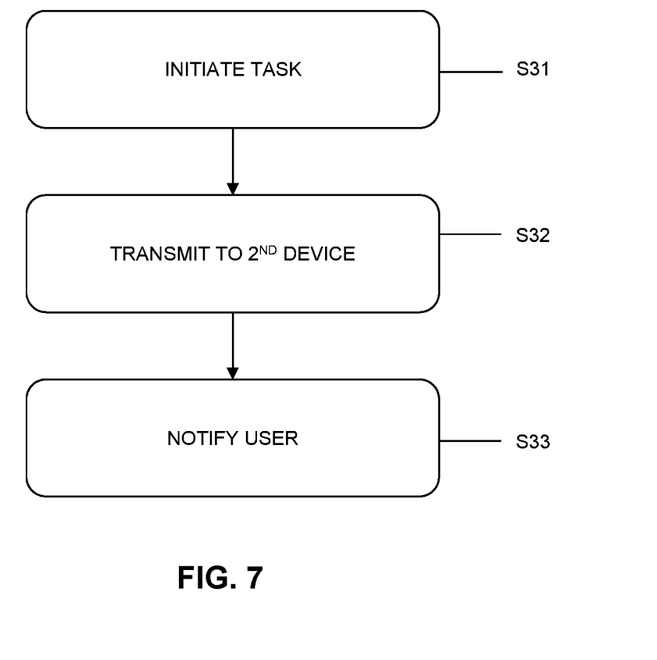
FIG. 7 is a flowchart of a further exemplary method of ensuring display compliance.

FIG. 7 is a flowchart of an exemplary method.

Step S31 comprises creating a task.

Step S32 comprises transmitting the task to a second wearable device.

Step S33 comprises displaying the task on the second wearable device.

The above-described systems and methods may advantageously allow a retail store to conveniently monitor the compliance of product labels displayed on display units. The systems and methods may help to ensure that the information displayed on product labels in the retail store is in line with the information held in a corresponding database. Consequently, errors in pricing or promotional information are avoided, thereby avoiding any customer inconvenience associated with inaccurate labelling.

The above-described systems and methods may also advantageously allow a retail store to ensure the compliance of display units, and accurately and easily assess the state of a display unit with reference to a reference image thereof.

Advantageously, the systems and methods make use of portable, wearable devices to allow the users to carry out their normal duties whilst operating the system. Retail store staff may have a wide variety of skills and backgrounds, and the above-described embodiments provide a simple and intuitive system which may be operate with minimal training.

These advantageous systems may improve the general appearance of the retail store, thereby increasing shopper convenience and sales of goods.

Although a few preferred embodiments have been shown and described, it will be appreciated by those skilled in the art that various changes and modifications might be made without departing from the scope of the invention, as defined in the appended claims.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality.

In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination.

In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

The invention claimed is:

1. A system for monitoring compliance of a display unit in a retail store, comprising:
   a wearable device configured to be worn by a user while in use;
   a server coupled to the wearable device by a communication network;
   wherein the wearable device is configured to:
   capture an image of a product label on a display unit;
   process the captured image to extract product identity information from a machine readable portion of the product label in the captured image;
   retrieve stored label information from the server based on the extracted product identity information; and
   display the retrieved stored label information by the wearable device simultaneously in a field of view of the user with a human readable portion of the product label, thereby allowing a compliance comparison therebetween.

2. The system of claim 1, wherein the wearable device is further configured to:
  extract displayed label information from the human readable portion of the product label in the captured image;
  compare the extracted displayed label information from the human readable portion of the product label with the stored label information as retrieved from the server, and
  display an alert in the field of view of the user if the retrieved stored label information is not the same as the extracted displayed label information.

3. The system of claim 2, wherein the wearable device is configured to extract the displayed label information using optical character recognition.

4. The system of claim 1, wherein the wearable device is configured to operate in a scanning mode, in which the wearable device continuously captures images.

5. The system of claim 1, wherein the machine readable portion of the product label comprises a barcode.

6. The system of claim 1, wherein the stored label information is stored in a database, and the database is configured to be updated on a periodic basis to reflect changes in the stored label information.

7. The system of claim 1, wherein the wearable device is a pair of smart glasses.

8. The system of claim 1, further comprising a second wearable device configured to communicate with the first wearable device,
  wherein the first wearable device is configured to create a task message and transmit the task message to the second wearable device, and
  wherein the second wearable device is configured to display the task message.

9. The system of claim 8, wherein the second wearable device is configured to transmit a confirmation that the task has been completed to the first wearable device.

10. The system of claim 9, wherein the second wearable device comprises a second image capture unit configured to capture an image showing evidence of the completed task, and wherein the confirmation includes the captured image showing evidence of the completed task.

11. The system of claim 8, wherein the first wearable device is configured to communicate with the second wearable device via the server.

12. A method of ensuring display unit compliance in a retail store, comprising:
  capturing an image of a product label on a display unit using a wearable device;
  processing the captured image to extract product identity information from a machine readable portion of the product label in the captured image;
  retrieving stored label information based on the extracted product identity information; and
  displaying, by the wearable device, the retrieved stored label information simultaneously in a field of view of the user with a human readable portion of the product label, thereby allowing a compliance comparison therebetween.

13. The method of claim 12, further comprising:
  extracting displayed label information from a human readable portion of the product label in the captured image;
  comparing the extracted label information with the stored label information, and
  displaying, by the wearable device, an alert in the field of view of the user if the retrieved stored label information is not the same as the extracted label information.

14. The method of claim 13, further comprising:
  creating a task message;
  transmitting the task message to a second wearable device; and
  displaying the task message on the second wearable device.

15. A computer readable medium having instructions recorded thereon which when executed cause a wearable computer device to perform a method of ensuring display unit compliance in a retail store, comprising:
  capturing an image of a product label on a display unit using the wearable computer device;
  processing the captured image to extract product identity information from a machine readable portion of the product label in the captured image;
  retrieving stored label information based on the extracted product identity information; and
  displaying, by the wearable computer device, the retrieved stored label information simultaneously in a field of view of the user with a human readable portion of the product label, thereby allowing a compliance comparison therebetween.

* * * * *

UNITED STATES PATENT AND TRADEMARK OFFICE
CERTIFICATE OF CORRECTION

PATENT NO. : 10,360,613 B2  
APPLICATION NO. : 15/512545  
DATED : July 23, 2019  
INVENTOR(S) : Philip Stout

Page 1 of 1

It is certified that error appears in the above-identified patent and that said Letters Patent is hereby corrected as shown below:

On the Title Page

Item (73), should read Asda Stores Limited, Leeds Yorkshire, (GB).

Signed and Sealed this
Eighteenth Day of February, 2020

Andrei Iancu
*Director of the United States Patent and Trademark Office*